US012657052B2

(12) United States Patent
Curtis

(10) Patent No.: US 12,657,052 B2
(45) Date of Patent: Jun. 16, 2026

(54) REDUCING LATENCY IN HIGHLY SCALABLE HPC APPLICATIONS VIA ACCELERATOR-RESIDENT RUNTIME MANAGEMENT

(71) Applicant: Advanced Micro Devices, Inc., Santa Clara, CA (US)

(72) Inventor: Nicholas James Curtis, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 460 days.

(21) Appl. No.: 17/454,607

(22) Filed: Nov. 11, 2021

(65) Prior Publication Data

US 2023/0145253 A1     May 11, 2023

(51) Int. Cl.
| | |
|---|---|
| *G06F 9/48* | (2006.01) |
| *G06F 9/38* | (2018.01) |
| *G06F 9/50* | (2006.01) |
| *G06F 9/54* | (2006.01) |

(52) U.S. Cl.
CPC .......... *G06F 9/4881* (2013.01); *G06F 9/3838* (2013.01); *G06F 9/48* (2013.01); *G06F 9/4806* (2013.01); *G06F 9/4843* (2013.01); *G06F 9/485* (2013.01); *G06F 9/50* (2013.01); *G06F 9/5005* (2013.01); *G06F 9/5027* (2013.01); *G06F 9/5038* (2013.01); *G06F 9/5088* (2013.01); *G06F 9/541* (2013.01); *G06F 9/545* (2013.01); *G06F 9/546* (2013.01); *G06F 2209/509* (2013.01)

(58) Field of Classification Search
CPC ........ G06F 9/48; G06F 9/4806; G06F 9/4843; G06F 9/485; G06F 9/4881; G06F 9/50; G06F 9/5005; G06F 9/5027; G06F 9/5038; G06F 9/5088; G06F 9/541; G06F 9/545; G06F 9/546; G06F 2209/509
See application file for complete search history.

(56) References Cited

U.S. PATENT DOCUMENTS

| | | | |
|---|---|---|---|
| 8,250,548 B2 | 8/2012 | Kasahara et al. | |
| 9,317,341 B2* | 4/2016 | Periorellis | G06F 9/52 |
| 11,487,589 B2 | 11/2022 | Cui et al. | |
| 2010/0095152 A1 | 4/2010 | Darrington et al. | |
| 2013/0232495 A1 | 9/2013 | Rossbach et al. | |

(Continued)

FOREIGN PATENT DOCUMENTS

| | | |
|---|---|---|
| CN | 110795228 A | 2/2020 |

OTHER PUBLICATIONS

Fonseca et al, "Schedulability analysis of DAG tasks with arbitrary deadlines under global fixed-priority scheduling", Real-Time Systems (2019) 55, Springer, Feb. 2019, pp. 387-432 (Year: 2019).*

*Primary Examiner* — Charles M Swift
(74) *Attorney, Agent, or Firm* — Volpe Koenig

(57) ABSTRACT

Methods and systems for runtime management by an accelerator-resident manager. Techniques include receiving, by the manager, a representation of a processing flow of an application, including a plurality of kernels and respective dependencies. The manager, then, assigns the plurality of kernels to one or more APUs managed it and launches the plurality of kernels on their assigned APUs to run in an iteration according to the respective dependencies.

20 Claims, 6 Drawing Sheets

(56) References Cited

U.S. PATENT DOCUMENTS

| 2017/0038919 | A1* | 2/2017 | Moss | .................... | G06F 3/0482 |
| 2018/0150298 | A1 | 5/2018 | Balle et al. | | |
| 2018/0307499 | A1* | 10/2018 | Chen | ..................... | G06F 15/76 |
| 2020/0341812 | A1 | 10/2020 | McClure | | |
| 2021/0192672 | A1* | 6/2021 | Mccrary | .................. | G06T 1/20 |
| 2021/0334933 | A1* | 10/2021 | Strauss | .................... | G06T 1/20 |
| 2022/0129272 | A1* | 4/2022 | Wang | ................... | G06F 9/4881 |
| 2022/0237040 | A1* | 7/2022 | Shin | ...................... | G06N 3/063 |

* cited by examiner

100A

100B

200

300

400

500

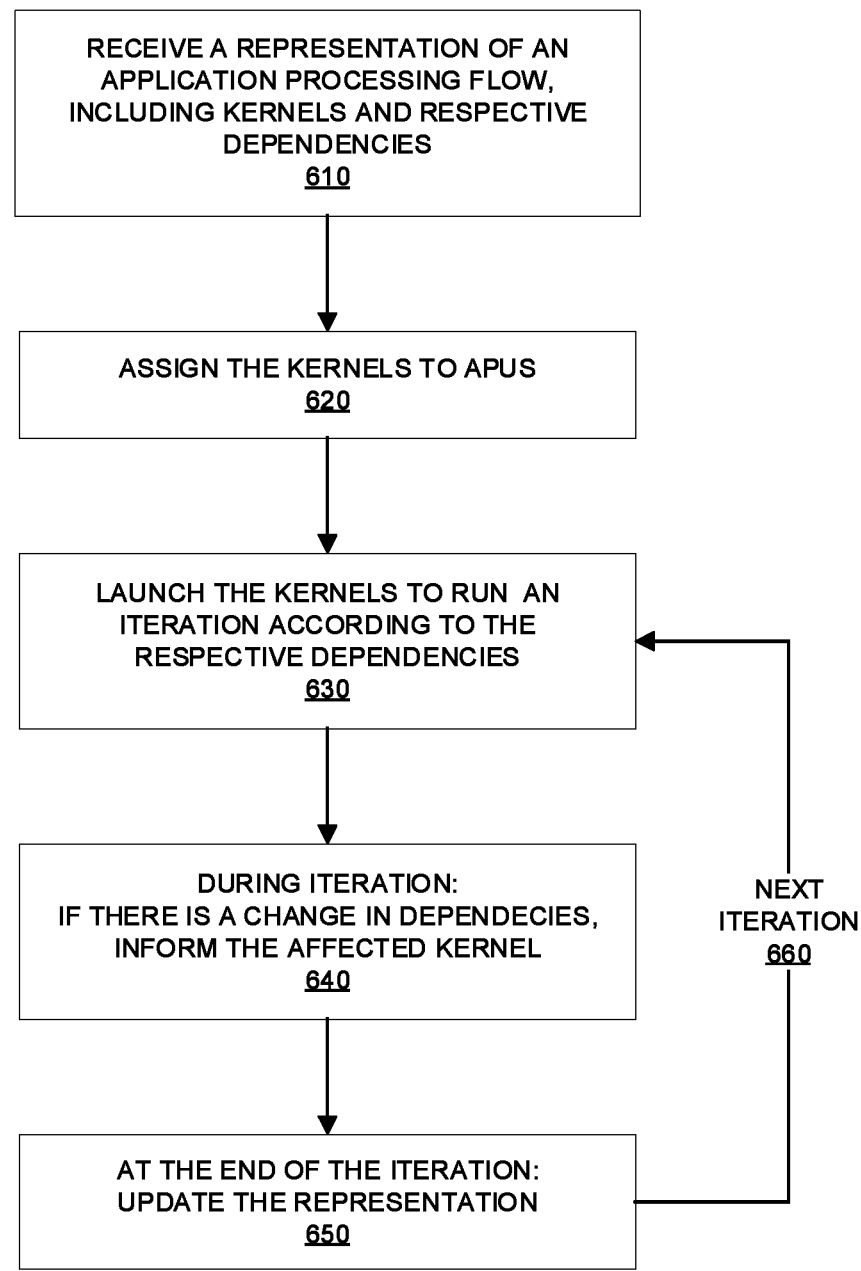

RECEIVE A REPRESENTATION OF AN
APPLICATION PROCESSING FLOW,
INCLUDING KERNELS AND RESPECTIVE
DEPENDENCIES
610

ASSIGN THE KERNELS TO APUS
620

LAUNCH THE KERNELS TO RUN AN
ITERATION ACCORDING TO THE
RESPECTIVE DEPENDENCIES
630

DURING ITERATION:
IF THERE IS A CHANGE IN DEPENDECIES,
INFORM THE AFFECTED KERNEL
640

NEXT
ITERATION
660

AT THE END OF THE ITERATION:
UPDATE THE REPRESENTATION
650

REDUCING LATENCY IN HIGHLY SCALABLE HPC APPLICATIONS VIA ACCELERATOR-RESIDENT RUNTIME MANAGEMENT

BACKGROUND

Accelerated Processing Units (APUs) are adept by design to efficiently execute thousands of processes (computational tasks or kernels) in parallel. A typical application may involve processes that have to be performed sequentially and processes that can be parallelized. Hence, an application software architecture may include sequential parts that can be designed to run on Central Processing Units (CPUs) and parallelable parts that can be designed to run on accelerators, including APUs or clusters of APUs, to achieve high performance afforded by the clusters. However, since processes executed on CPUs manage the work executed on APUs (such as the synchronization and the launching of kernels) significant latency is introduced by CPU-APU communications. Such latency is especially significant for strongly-scaled High Performance Computing (HPC) applications, where a myriad of kernels with small workload are managed by a CPU. In such cases, the time spent by a CPU in synchronizing and launching kernels may rival or even surpass the execution time of the kernels themselves. Moreover, changes in dependencies among kernels occurring during runtime may further contribute to CPU-APU communications related latencies, as it requires the CPU to interrupt runtime operation in order to adjust the synchronization scheme. Techniques are needed to reduce CPU-APU communications related latencies.

BRIEF DESCRIPTION OF THE DRAWINGS

A more detailed understanding may be had from the following description, given by way of example in conjunction with the accompanying drawings wherein:

FIG. 6 is a flowchart of an example method for accelerator-resident runtime management, based on which one or more features of the disclosure can be implemented.

DETAILED DESCRIPTION

HPC applications often benefit from parallelized computations that can be independently performed on a large number of data elements. Performance scaling can be achieved by a system that includes multiple clusters of APUs, on which kernels can run in parallel and where each kernel can perform computations with respect to one or more data elements. In such a regime, latency may be increased by various components of the system, e.g., the network-interface controllers (NICs), CPUs, or APUs. Often, communications among these components is a key performance limitation.

System and methods are disclosed in the present application that reduce latency that is contributed by communications among CPUs and accelerators (e.g., one or more clusters of APUs). Such communications are necessitated by the CPUs' role in managing the execution of kernels on the accelerators. Techniques are described herein wherein management of application execution flow is performed by accelerator-resident managers, that is, the managing functionality is performed by modules residing in respective accelerators. The disclosed accelerator-resident managers control, for example, kernel launching and synchronization—decoupling the accelerators from CPUs' control during runtime.

Methods for runtime management by an accelerator-resident manager are disclosed herein. The methods comprise receiving, by the manager, a representation of a processing flow of an application, including a plurality of kernels and respective dependencies; assigning, by the manager, the plurality of kernels to one or more APUs managed by the manager; and launching, by the manager, the plurality of kernels on their assigned APUs to run in an iteration according to the respective dependencies.

Systems for runtime management by an accelerator-resident manager are also disclosed. The systems comprise at least one processor and memory storing instructions. The instructions, when executed by the at least one processor, cause the system to receive, by the manager, a representation of a processing flow of an application, including a plurality of kernels and respective dependencies; assign, by the manager, the plurality of kernels to one or more APUs managed by the manager; and launch, by the manager, the plurality of kernels on their assigned APUs to run in an iteration according to the respective dependencies.

Further, a non-transitory computer-readable medium comprising instructions executable by at least one processor to perform methods for runtime management by an accelerator-resident manager is disclosed herein. The methods comprise receiving, by the manager, a representation of a processing flow of an application, including a plurality of kernels and respective dependencies; assigning, by the manager, the plurality of kernels to one or more APUs managed by the manager; and launching, by the manager, the plurality of kernels on their assigned APUs to run in an iteration according to the respective dependencies.

Figure 1A:
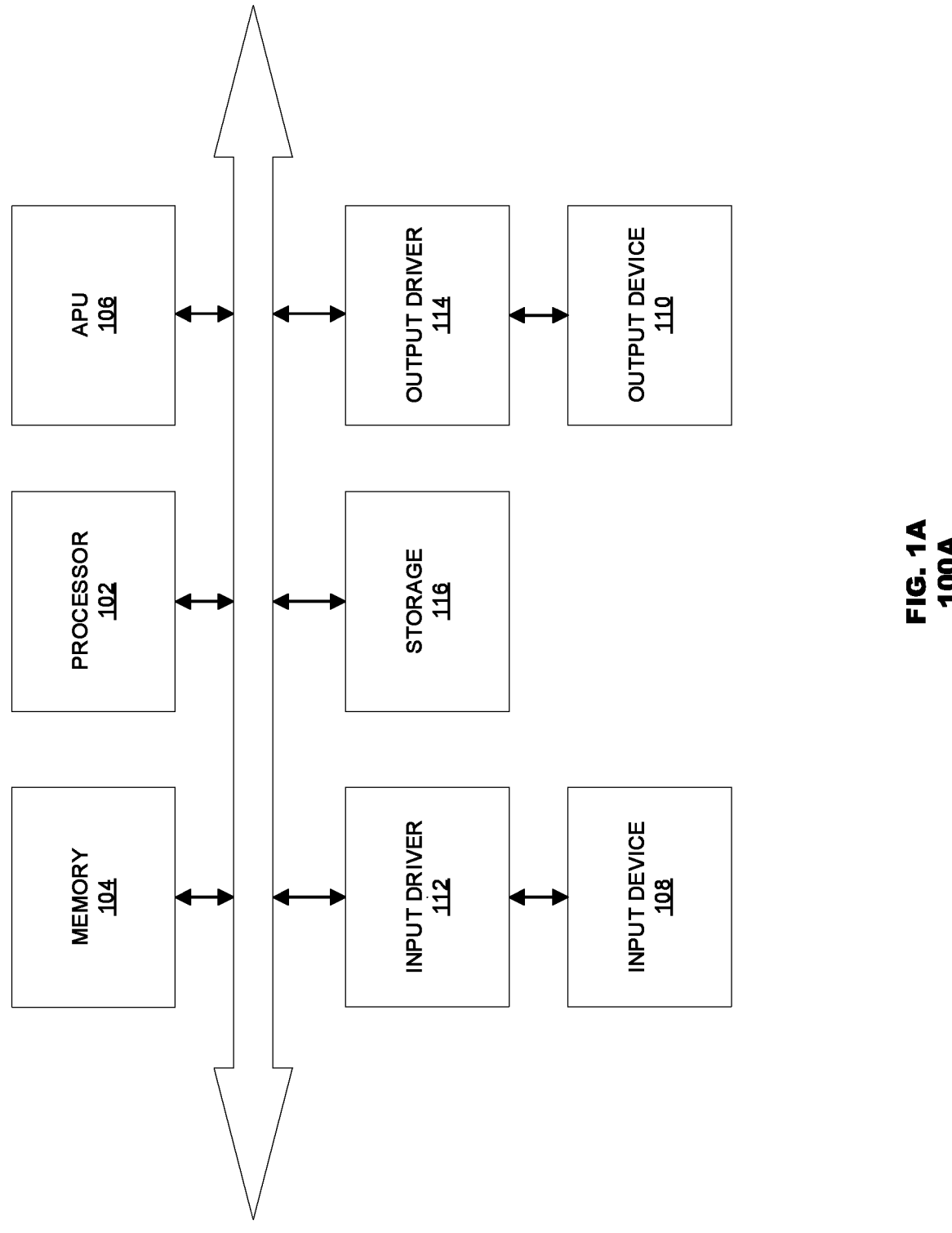
FIG. 1A is a block diagram of an example device, based on which one or more features of the disclosure can be implemented.

FIG. 1A is a block diagram of an example device 100A, based on which one or more features of the disclosure can be implemented. The device 100A can be, for example, a computer, a gaming device, a handheld device, a set-top box, a television, a mobile phone, or a tablet computer. The device 100A includes a processor 102, an APU 106, memory 104, storage 116, an input device 108, and an output device 110. The device 100A can also include an input driver 112 and an output driver 114. In an aspect, the device 100A can include additional components not shown in FIG. 1A.

The processor 102 can include a CPU or one or more cores of CPUs. The APU 106 can represent a highly parallel processing unit, a graphics processing unit (GPU), or a combination thereof. The processor 102 and the APU 106 may be located on the same die or on separate dies. The memory 104 can be located on the same die as the processor 102, or can be located separately from the processor 102. The memory 104 can include volatile or non-volatile memory, for example, random access memory (RAM), dynamic RAM (DRAM), a cache, or a combination thereof.

The storage 116 can include fixed or removable storage, for example, a hard disk drive, a solid-state drive, an optical disk, or a flash drive. The input device 108 can represent one or more input devices, such as a keyboard, a keypad, a touch screen, a touch pad, a detector, a microphone, an accelerometer, a gyroscope, a biometric scanner, or a network connection (e.g., a wireless local area network card for receipt of wireless IEEE 802 signals). The output device 110 can represent one or more output devices, such as a display, a speaker, a printer, a haptic feedback device, one or more lights, an antenna, or a network connection (e.g., a wireless local area network card for transmission of wireless IEEE 802 signals).

The input driver 112 communicates with the processor 102 and the input device 108, and facilitates the receiving of input from the input device 108 to the processor 102. The output driver 114 communicates with the processor 102 and the output device 110, and facilitates the sending of output from the processor 102 to the output device 110. In an aspect, the input driver 112 and the output driver 114 are optional components, and the device 100A can operate in the same manner when the input driver 112 and the output driver 114 are not present.

The APU 106 can be configured to accept compute commands and graphics rendering commands from processor 102, to process those compute and graphics rendering commands, and/or to provide output to a display (output device 110). As described in further detail below, the APU 106 can include one or more parallel processing units configured to perform computations, for example, in accordance with a single instruction multiple data (SIMD) paradigm. Thus, although various functionality is described herein as being performed by or in conjunction with the APU 106, in various alternatives, the functionality described as being performed by the APU 106 can be additionally or alternatively performed by other computing devices having similar capabilities that are not driven by a host processor (e.g., processor 102) and that can be configured to provide, for example, graphical output to a display. Whether or not a processing system can perform processing tasks in accordance with a SIMD paradigm, the processing system can be configured to perform the functionality described herein.

Figure 1B:
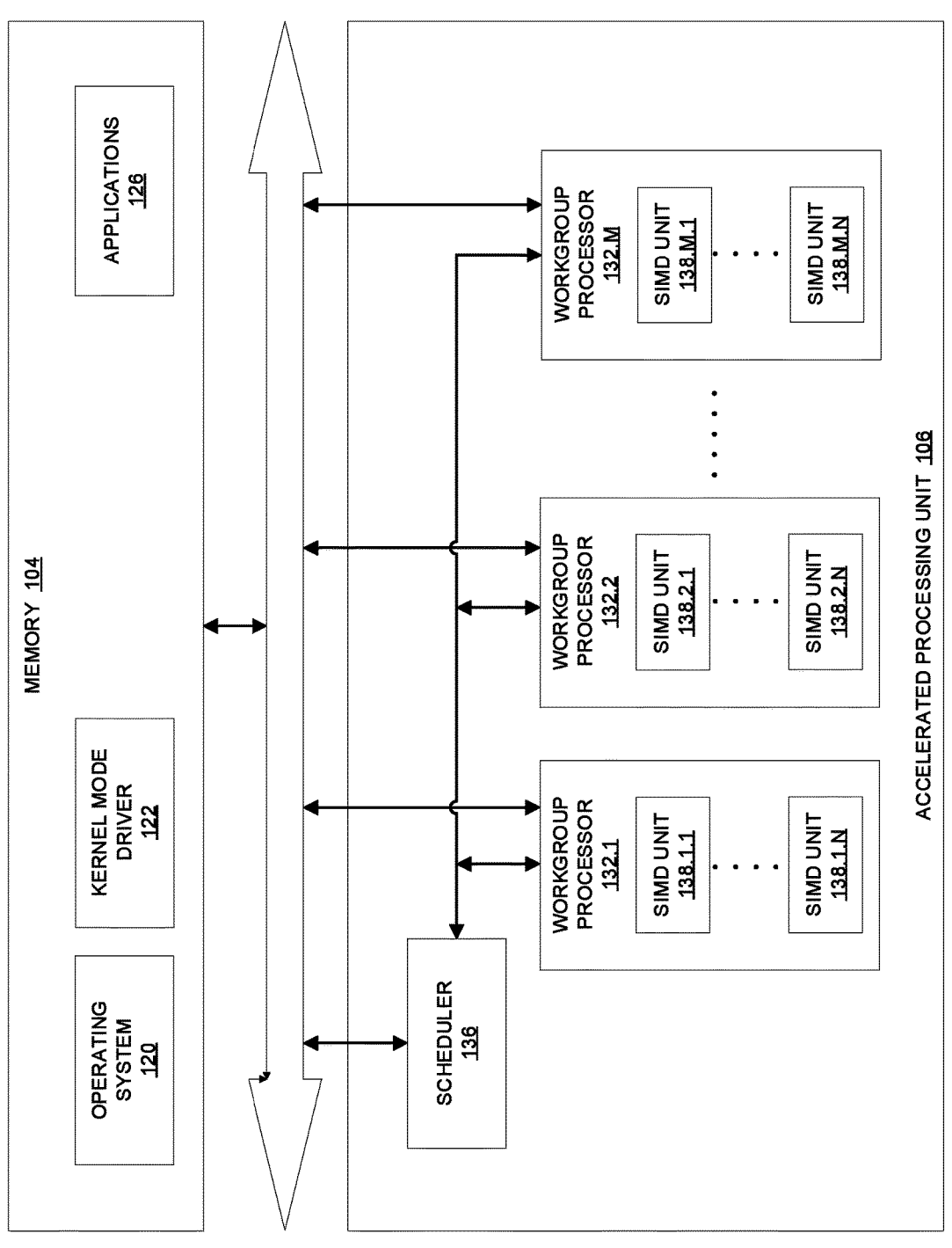
FIG. 1B is a block diagram of an example system, demonstrating an accelerated system employable by the device of FIG. 1A, based on which one or more features of the disclosure can be implemented.

FIG. 1B is a block diagram of an example system 100B, demonstrating an accelerated system employable by the device of FIG. 1A, based on which one or more features of the disclosure can be implemented. FIG. 1B illustrates in further detail the execution of processing tasks on APU 106. The processor 102 can maintain in memory 104 one or more modules for execution by the processor 102. The modules include an operating system 120, a kernel mode driver 122, and applications 126. These modules can control various features of the operation of the processor 102 and the APU 106. For example, the operating system 120 can provide system calls, that is, application programming interfaces (APIs), that can be employed by applications 126 to directly interface with the hardware. The kernel mode driver 122 can control operation of the APU 106 by, for example, providing APIs to applications 126 executing on the processor 102 to access various functionality of the APU 106.

The APU 106 can execute commands related to graphics operations and non-graphics operations, including either parallel processing or sequential processing and either ordered or non-ordered processing. The APU 106 can be used for executing graphics pipeline operations—such as operations that process pixels and/or geometric computations (e.g., rendering an image to the display (output device 110))—based on commands received from the processor 102. The APU 106 can also execute processing operations that are not related to graphics operations, such as operations related to processing of multi-dimensional data, physics simulations, computational fluid dynamics, or other computational tasks, based on commands received from the processor 102.

The APU 106 can include WGPs 132.1-M; each WGP, e.g., 132.1, can have one or more SIMD units, e.g., 138.1.1-N, that can perform operations in a parallel manner according to a SIMD paradigm. The SIMD paradigm is one in which multiple processing elements share a single program control flow unit and program counter, and, thus, can execute the same program but on different data. In one example, each SIMD unit, e.g., 138.1.1, can run 64 lanes (i.e., threads), where each lane executes the same instruction at the same time as the other lanes in the SIMD unit, but executes that instruction on different data. Lanes can be switched off with predication, such as when not all the lanes are needed to execute a given instruction. Predication can also be used to execute programs with divergent control flows. Specifically, for programs with conditional branches (or other instructions where control flow is based on calculations performed by an individual lane), predication of lanes corresponding to control flow paths not currently being executed and serial execution of different control flow paths allows for arbitrary control flow. In an aspect, each of the WGPs 132.1-M can have a local cache. In another aspect, multiple WGPs can share a cache.

The basic unit of execution in a WGP, e.g., 132.1, is a work-item. Typically, each work-item represents a single instantiation of a program that can be executed in parallel in a particular lane. Work-items can be executed simultaneously as a "wavefront" (or a "wave") on a single SIMD, e.g., 138.1.1. One or more waves can be run in a workgroup, each wave including a collection of work-items designated to execute the same program. A workgroup is executed by executing each of the waves that make up the workgroup. The waves can also be executed sequentially on a single SIMD unit or partially or fully in parallel on different SIMD units, 138.1-N. Thus, a wave can be thought of as a collection of work-items that can be executed simultaneously on a single SIMD unit e.g., 138.1.1. Thus, if commands received from the processor 102 indicate that a particular program is to be parallelized to such a degree that the program cannot be executed on a single SIMD unit simultaneously, then that program can be broken up into waves which can be parallelized on two or more SIMD units (e.g., 138.1.1-N), serialized on the same SIMD unit (e.g., 138.1.1.), or both parallelized and serialized as needed. A scheduler 136 can be configured to perform operations related to launching various waves on the different WGPs 132.1-M and their respective SIMD units.

The parallelism afforded by the WGPs 132.1-M is suitable, for example, for graphics-related operations such as operations on pixel values (e.g., filter operations), operations on geometrical data (e.g., vertex transformations), and other graphics related operations. For example, an application 126, executing on the processor 102, can involve computations to be performed by the APU 106. The application 126 can use APIs provided by the kernel mode driver 122 to issue processing commands to the APU 106. The processing commands are then provided to the scheduler 136. The scheduler 136 translates the processing commands into computation tasks that are assigned to the WGPs 132.1-M for execution in parallel. For example, the scheduler 136 may receive a processing command that includes instructions to be perform on data (e.g., 1024 pixels of an image). In response, the scheduler 136 can chunk the data into groups (e.g., each group containing data required for the processing of 64 pixels) and launch waves in one or more WGPs, each wave associated with a group of data and instructions to perform on the data. For example, the scheduler 136 may launch 16 waves (e.g., each in charge of processing 64 pixels) to be executed in SIMDs 138 of one or more WGPs 132.

Figure 2:
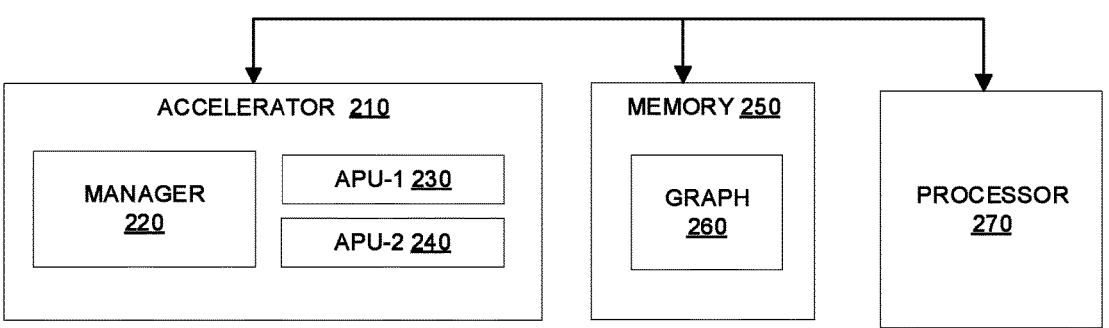
FIG. 2 is a block diagram of an example system, demonstrating central management of application runtime, based on which one or more features of the disclosure can be implemented.

FIG. 2 is a block diagram of an example system 200, demonstrating central management of application runtime, based on which one or more features of the disclosure can be implemented. The system 200 includes an accelerator 210, memory 250, and a processor 270. The accelerator 210 can include a manager 220 and one or more APUs (e.g., the APU 106 of FIG. 1B), such as APU-1 230 and APU-2 240. The processor 270 (e.g., processor 102 of FIG. 1A) can utilize API exposed by the manager 220 to initiate a representation that defines the processing flow of an application to be executed by the accelerator 210.

A representation of an application's processing flow can be expressed by a graph 260 (as further explained by FIG. 3) that defines the application's kernels and dependencies among the kernels. Such a graph 260 can be stored in and accessed from the memory 250. Once the representation has been initiated, the manager 220 can assign each kernel to an APU of the accelerator 210 and can launch the kernels on their assigned APU to run in one or more iterations according to the processing flow defined by the representation. For example, when a representation of an application's processing flow is expressed by a graph 260, once the graph has been initiated, the manager 220 can partition the graph among the APUs of the accelerator 210, so that kernels associated with one graph's partition are assigned to one APU, e.g., APU-1 230, and kernels associated with another graph's partition are assigned to another APU, e.g., APU-2 240. Then, the manager 210 can execute the application according to the graph by launching kernels to run on their assigned APUs in accordance with dependencies defined by the graph 260. The manager 220 can be implemented by dedicated hardware (e.g., embedded RISC processor, special purpose APU), can be implemented by a process running on one of the APUs 230, 240, or can be implemented by a combination of hardware and software.

Figure 3:
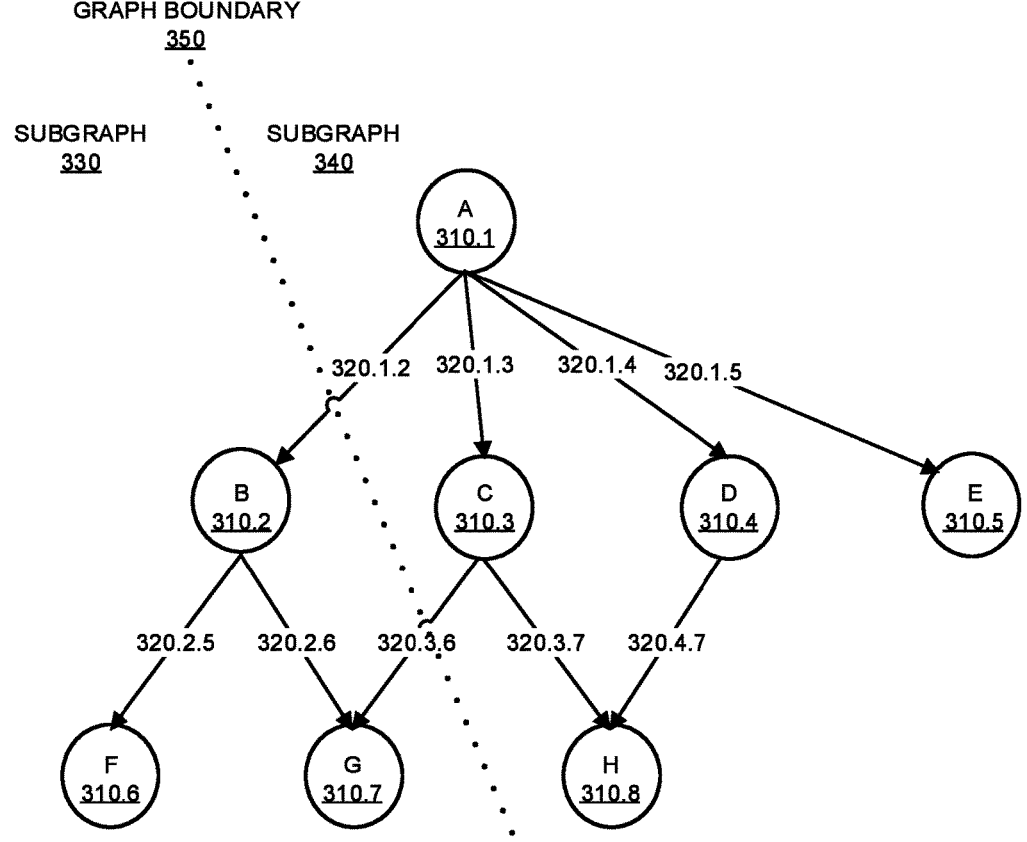
FIG. 3 illustrates an example graph, based on which one or more features of the disclosure can be implemented.

FIG. 3 illustrates an example graph 300, based on which one or more features of the disclosure can be implemented. The graph's 300 nodes 310 represent kernels. Each kernel is a task that processes one or more data elements stored in memory 250, for example. Thus, each kernel receives input data and delivers output data (e.g., a processed version of the input data). The graph's 300 edges 320 represent data dependencies. For example, the edge 320.1.2 represents that kernel B 310.2 depends on kernel A 310.1, meaning that kernel B 310.2 has to operate on data that are generated by kernel A 310.1 (or the input to kernel B 310.2 is the output of kernel A 310.1), and, therefore, kernel B 310.2 cannot start execution until kernel A 310.1 completes its own execution first.

Thus, the manager 220 can use the graph 300 to determine the kernels to be launched and at what order based on the kernels' dependencies as described by the graph. In addition, each node is assigned to an APU according to a partition determined by the manager. As shown in FIG. 3, the graph 300 can be partitioned into two subgraphs, 330 and 340, by graph boundary 350, where the subgraph 330 to the left of the graph boundary 350 can be assigned to be executed by APU-1 230 of FIG. 2 and the subgraph 340 to the right of the graph boundary 350 can be assigned to be executed by APU-2 240 of FIG. 2.

Hence, in addition to kernels and their assigned APUs, a graph's nodes, e.g., 310.1-310.8, can have associated with them other data entities that can be instrumental in managing the application runtime by the manager 220. Each node can have associated with it one or more mailboxes (e.g., stored in the memory 250). A mailbox at a node can be used by another kernel (on which the kernel associated with the node depends) to leave a message (i.e., a completion-message) indicating that the other kernel completed its execution, and, thus, the node's associated kernel, unless still waiting for more other kernels to complete their execution, can start its own execution. For example, node 310.7 can have associated with it two mailboxes, one to be used by kernel B (associated with node 310.2) and the other to be used by kernel C (associated with node 310.3). When kernel B and kernel C complete their respective executions, they send a message to that effect to their respective mailboxes at node 310.7. Task G that waits on these mailboxes, once receiving these completion-messages, can start its own execution.

In an aspect, each node of a graph 300 can be associated with as many mailboxes as is the number of dependencies its associated kernel has. When a kernel completes operation on its assigned APU, it can send a completion-message to mailboxes the kernel is registered with. These are mailboxes that are dedicated to that kernel located at nodes that branch out of that kernel's node. Once all the mailboxes at a node receive messages indicating the completion of kernels registered with these mailboxes, the kernel associated with that node can be executed immediately by the APU it is assigned to. Meanwhile, the manager can asynchronously update the graph, e.g., based on the status of mailboxes of the graph.

In an aspect, the graph can change its structure dynamically as dependencies change during the execution of an iteration of the application at runtime. For example, the graph may represent kernels that are designed to solve a physical problem, in which each kernel is engaged in processing data associated with a certain physical entity and in which the dependency among the kernels stems from the spatial distances among corresponding entities. So, if a first kernel is designed to process the data associated with entity Q and a second kernel is designed to process the data associated with entity P, it may be that as long as entities Q and P are spatially close to each other, the second kernel depends on the first kernel. However, if entities Q and P move away from each other (as may occur in a simulation of a physical system) the dependency between the first and the second kernels terminates. In such a case, to respond to such a change without interrupting the runtime operation, the first kernel can send a message to its dedicated mailbox at the node associated with the second kernel that indicates that the second kernel no longer depends on the first kernel. Consequently, the second kernel (unless dependent on other kernels that are yet to be completed) can begin its own execution on its assigned APU. Thus, for example, a mailbox at node 310.7 (that is associated with kernel G) can be registered to receive messages from kernel C (that is associated with node 310.3). That mailbox may receive a message (i.e., a completion-message) indicating that kernel C has been completed or a message (i.e., a termination-message) indicating that the dependency on kernel C does not exist anymore. Both messages can prompt the execution of kernel G. Independently from breaking (or terminating) a dependency directly via mailbox communication, the manager 220 can asynchronously update the graph to reflect a change in dependency based on the messages stored in the mailboxes of the graph. For example, at the end of an iteration, the manager can update the partition of the graph (the assignment of kernels to APUs) based on changes in dependencies.

A change in dependencies, as described above, in addition to resulting in a termination of an existing dependency, can also create a new dependency. Consider the example described above, where a graph represents kernels designed to solve a physical problem and where dependency among these kernels stems from the spatial distances among corresponding entities. If a first kernel is designed to process the data associated with entity Q and a second kernel is designed to process the data associated with entity P, it may be that as long as entities Q and P are spatially away from each other, the second kernel does not depend on the first kernel. However, if entities Q and P move closer to each other (as may occur in a simulation of a physical system) a dependency between the first and the second kernels can be created. In such a case, to respond to such a change without interrupting the runtime operation, the first kernel can create a new mailbox registered (or dedicated) to it that will be associated with the node of the second kernel. Then, upon completion of its operation, the first kernel can leave a completion-message at that mailbox. Thus, for example, kernel G of node 310.7 is shown not to be dependent on kernel D. However, when a dependency is created, kernel D can create a new mailbox at node 310.7 dedicated to it. Once kernel D completes its operation, it can send a completion-message to that new mailbox. Upon receipt of that completion-message, kernel G (unless still waiting to receive completion-messages from kernels B and C) can start its own execution. Independently of creating a new dependency directly via mailbox communication, as described above, the manager 220 can asynchronously update the graph to reflect the change in dependency based on the messages stored in the mailboxes of the graph. For example, at the end of an iteration, the manager can update the partition of the graph (the assignment of kernels to APUs) based on changes in dependencies.

In another aspect, the manager 220 can perform load-balancing at the end of each iteration by monitoring the time it takes each APU to complete the kernels assigned to it and, then, the manager 220 can repartition the graph to improve the load-balance across all APUs. Thus, a graph's nodes, e.g., 310.1-310.8, can have timers associated with them. A node's timer can be set to measure the execution time of a kernel associated with the node. Thus, at the end of each iteration of the graph 300, the manager 220 may repartition the graph in order to load-balance its operation based on analyses of the timers' readings. For example, at the end of an execution iteration, based on analyses of the timers' readings, the manager 220 can find that it took much more time for APU-2 240 to execute the kernels associated with its own assigned subgraph 340 compared with the time it took APU-1 230 to execute the kernels associated with its own assigned subgraph 330. In such a case, the manager 220 may decide to load-balance the graph by repartitioning the graph so that, e.g., node 310.5 becomes part of subgraph 330 and, thus, kernel E that is associated with node 310.5 will be executed by APU-1 230 in the next iteration of the graph.

Figure 4:
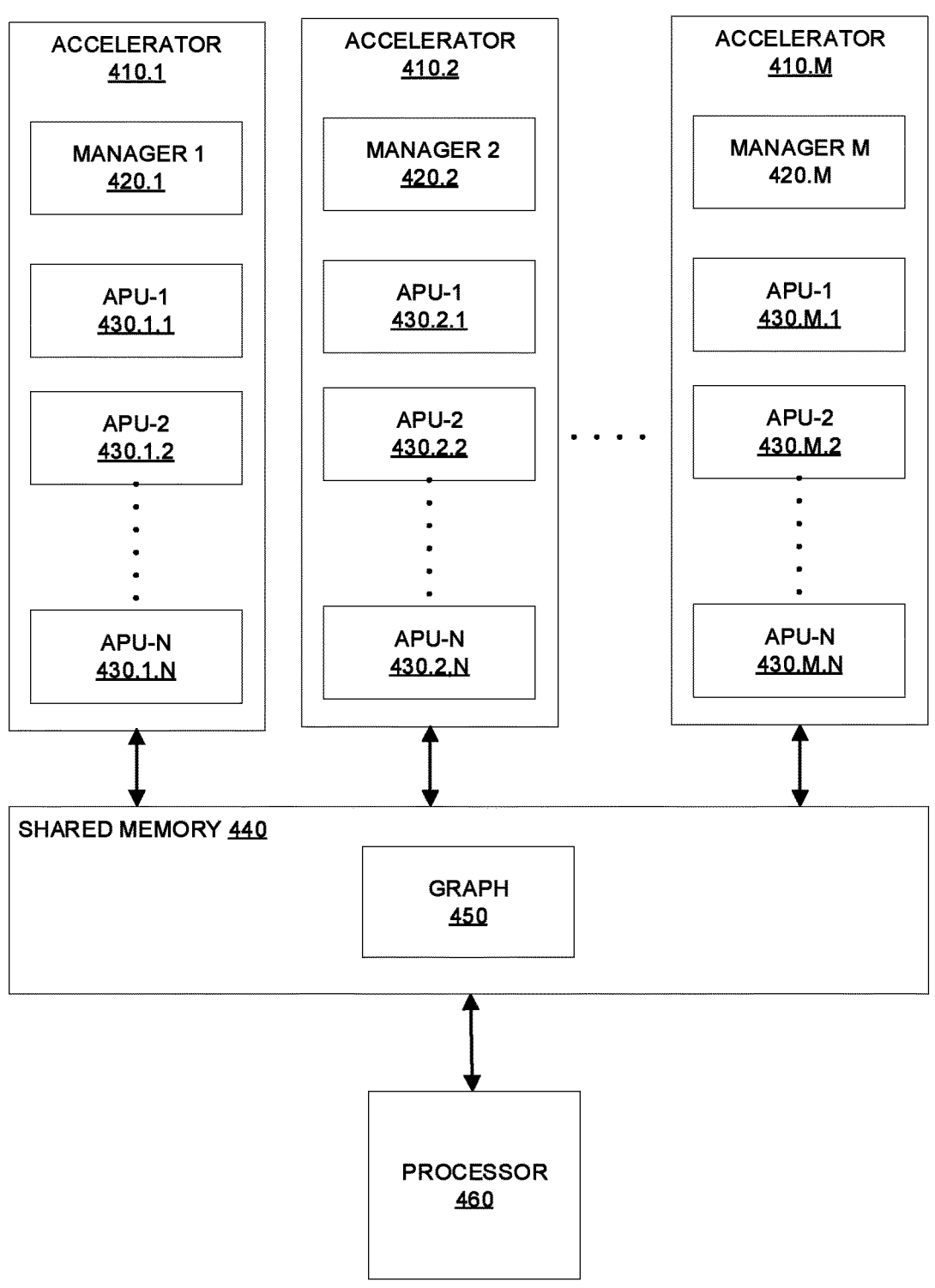
FIG. 4 is a block diagram of an example system, demonstrating distributed management of application runtime, based on which one or more features of the disclosure can be implemented.

FIG. 4 is a block diagram of an example system 400, demonstrating distributed management of application runtime, based on which one or more features of the disclosure can be implemented. System 400 can include multiple accelerators 410.1-410.M, shared memory 440, and a processor 460. Each accelerator, e.g., 410.1, can include a manager 420.1 and a cluster of APUs, 430.1.1-430.1.N. The processor 460 can utilize API exposed by one of the managers to initiate a graph 450 that defines the processing flow of an application to be executed by the system 400. The initiated graph 450 can be stored in the shared memory 440, accessible by the managers 420.1-420.M, the clusters of APUs 430.1.1-430.1.N, 430.2.1-430.2.N, 430.M.1-430.M.N, and the processor 460 of the system 400. Once a graph 450 has been initiated, one of the managers, e.g., 420.1, can be in charge of partitioning the graph among the accelerators 410.1-410.M, resulting in accelerator-level subgraphs. Then, each accelerator's graph manager, e.g., 420.m, can proceed with further partitioning of its respective part of the graph (its respective accelerator-level subgraph) into APU-level subgraphs. Each such APU-level subgraph (or subgraph) is assigned to one APU of the accelerator 420.m. Upon completion of the partition of the graph 450 into subgraphs, each manager 420.m can begin with the execution of its own part of the graph 450 in one or more iterations by launching kernels in respective APUs, 420.m.1-420.m.N, according to dependencies defined by its part of the graph 450. Each manager 420.m can be implemented by dedicated hardware (e.g., embedded RISC processor, special purpose APU) or may be implemented by a process running on one of its accelerator's APUs. In an aspect, each manager 420.m can operate with respect to its own accelerator-level subgraph in a similar manner to the way that manager 220 of FIG. 2 can operate with respect to the graph 260 of FIG. 2.

Hence, as described above, each node of graph 450 is part of a subgraph that is an APU-level subgraph within an accelerator-level subgraph. The graph 450 has a structure by which nodes are connected; each node can have data or object entities associated with it, such as a kernel, an assigned APU, a mailbox, or a timer, as described with reference to FIG. 3. Accordingly, each node in the graph 450 is associated with a kernel that can be executed to process data, e.g., stored in the shared memory 440. Each edge in the graph 450 connects two nodes and represents a dependency between the kernels associated with the two nodes, as explained in reference to FIG. 3. Further, each node in the graph 450 can have associated with it one or more mailboxes (e.g., stored in the memory 440). A mailbox at a first node, associated with a first kernel, can be used by a second kernel (that the first kernel depends on) to leave a completion-message indicating that the second kernel has completed, and, thus, the first kernel, unless still waiting on other kernels to complete their execution, can start its own execution.

In reference to FIG. 3, subgraph 330 can be an APU-level subgraph within an accelerator-level subgraph of accelerator 410.1, and subgraph 340 can be an APU-level subgraph within an accelerator-level subgraph of accelerator 410.2. In this case, manager 420.1 can be configured to manage the execution of kernels B, F, and G, according to its own accelerator-level subgraph and manager 420.2 can be configured to manage the operation of kernels A, C, D, E, and H, according to its own accelerator-level subgraph. In an aspect, node 310.7 has two mailboxes associated with it that kernel G is waiting on, one registered to node 310.2 and the other registered to node 310.3. When kernel B (of node 310.2) completes its execution, it leaves a completion-message in the mailbox at node 310.7 that is registered to it. Likewise, when kernel C (of node 310.3) completes its execution, it leaves a completion-message in the mailbox at node 310.7 that is registered to it. Once these two completion-messages received, kernel G (of node 310.7) can starts its own execution immediately. Independently, managers, 420.1 and 420.2, can update their respective part of the graphs (respective accelerator-level subgraphs) to reflect the current status of operation.

As mentioned before, the graph 450 can change its structure dynamically as dependencies change during application runtime. For example, during the execution of kernel C, the kernel may be aware or otherwise may be informed that kernel G no longer depends on it. In such a case, kernel C can send a message to that effect to the mailbox registered to it at node 310.7. Then, kernel G, currently waiting on two mailboxes (one registered to kernel B and the other registered to kernel C), can begin its own execution once kernel B completed its execution. On the other hand, during the execution of kernel C, the kernel may be aware or otherwise may be informed that kernel F should now become dependent on it. In such a case, kernel C can create a new mailbox at node 310.6 which will be registered to it. Then, kernel F will wait on that new mailbox in addition to the mailbox registered to kernel B, and only when receiving a completion-message from both kernel B and kernel C, kernel F will start its own execution. Independently, the managers can update their respective parts of the graph to reflect the changes in dependencies. For example, manager 420.1, overseeing subgraph 330, can add an edge between node 310.3 and node 310.6 to reflect that now kernel F depends on kernel C; and manager 420.2, overseeing subgraph 340, can take out the edge between node 310.3 and node 310.7 to reflect that kernel G no longer depends on kernel C.

The managers 420.1-420.M, independently and with respect to the parts of the graph each is managing, or collaboratively with respect to all the graph 450, can perform load-balancing. This can be done by monitoring the timers associated with the nodes of the graph 450 that were set to measure the execution time of respective kernels. Thus, at the end of each execution iteration of the graph 450, based on analyses of the timers' readings, each manager may repartition its own accelerator-level subgraph in order to load-balance its operation. For example, in reference to FIG. 3, assuming the graph 300 is managed by one manager, 420.1, where kernels associated with subgraph 330 assigned to APU-1 430.1.1 and kernels associated with subgraph 340 assigned to APU-2 430.1.2. At the end of an iteration, based on analyses of the timers' readings, the manager 420.1 may find that it took much more time for APU-2 to execute the kernels associated with its assigned subgraph 340 compared with the time it took APU-1 to execute the kernels associated with its assigned subgraph 330. In such a case, the manager 420.1 may decide to load-balance the graph by repartitioning the graph. For example, the repartitioning may result in node 310.5 becoming part of subgraph 330, and, therefore, the kernel that is associated with node 310.5 will be executed by APU-1 230 in the next execution iteration of the graph.

In an aspect, load-balancing operations can be done collaboratively among the managers (possibly after an independent load-balancing took place as described above). For example, at the end of each iteration, each manager can compute a measure of availability of each APU in its control (within its own part of the graph) and can publish these APUs' availability measures to the other managers (by, e.g., storing the availability measures in the shared memory 440).

A measure of availability can be the time an APU has been idle during an iteration. For example, at the end of an iteration, managers 420.1 and 420.2 can compute the availability measures of APUs 430.1.1-430.1.N and 430.2.1-430.2.N, respectively. In the event that the availability measure of APU 430.1.1 is sufficiently high and the availability measures of APUs 430.2.1-430.2.N are sufficiently low, manager 420.1 can lock the graph 450, and, then, repartition the graph to change the assignment of one or more kernels that run on APUs 430.2.1-430.2.N to the available APU 430.1.1. Manager 420.2 can indicate whether manager 420.1 has the permission to perform that repartitioning. Other mechanisms may be used to collaboratively load-balance the graph 450. In an aspect, a manager's computation of availability measures of APUs in its own part of the graph can be done after (and while taking into account) an independent load-balancing of its own part of the graph.

Figure 5:
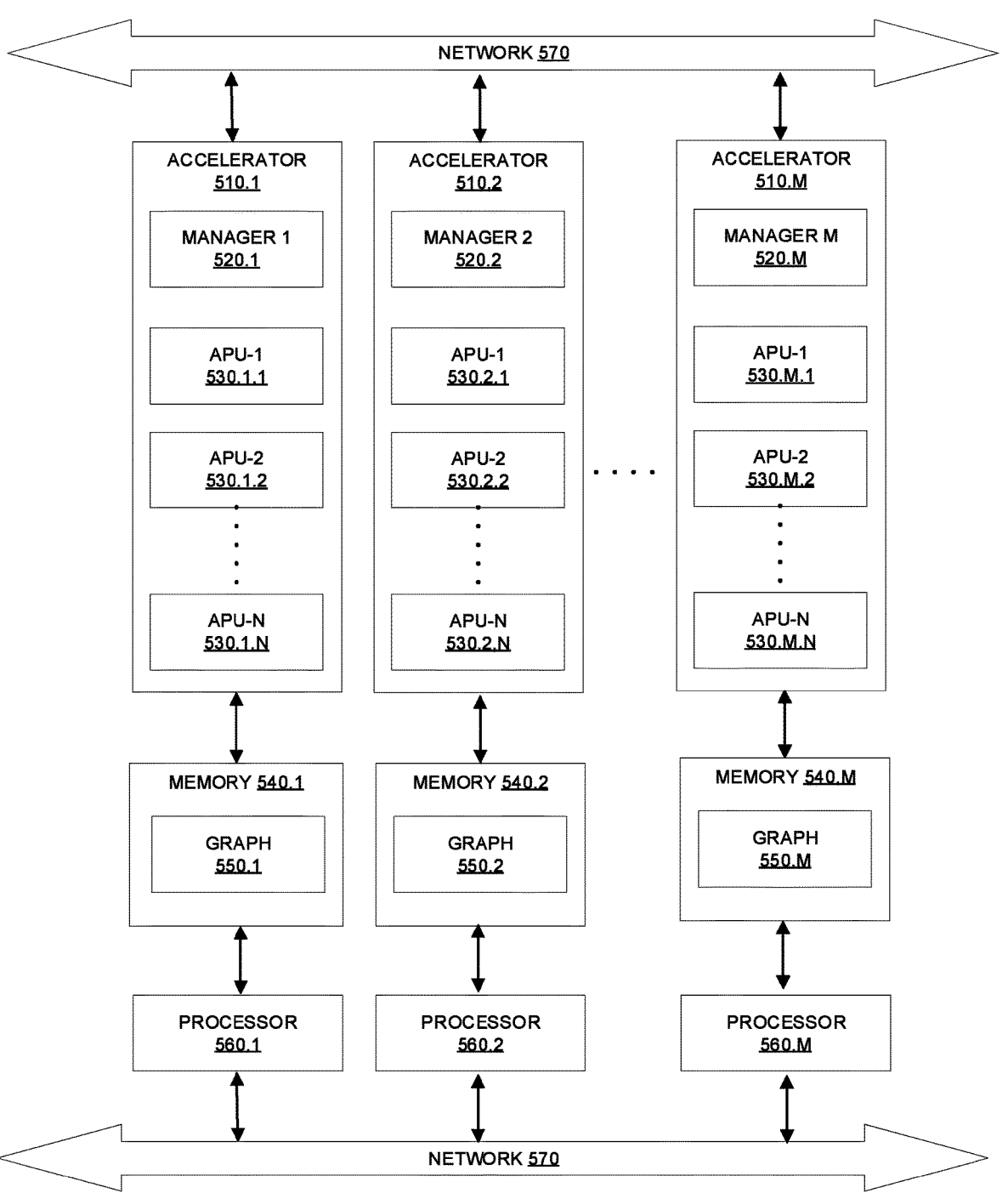
FIG. 5 is a block diagram of an example system, demonstrating distributed management of application runtime across network boundaries, based on which one or more features of the disclosure can be implemented.

FIG. 5 is a block diagram of an example system 500, demonstrating distributed management of application runtime across network boundaries, based on which one or more features of the disclosure can be implemented. System 500 can include multiple accelerators 510.1-510.M similar in their operation to the multiple accelerators 410.1-410.M of system 400 of FIG. 4. However, in system 500, the accelerators 510.1-510.M are remote to each other and each connected to respective memories 510.1-510.M and respective processors 560.1-560.M that are local to them. As shown, accelerators 510.1-510.M, memories 510.1-510.M, and processors 560.1-560.M are communicatively connected via a network 570. One of the processors, e.g., 560.1, can utilize API exposed by one of the managers, e.g., 520.1 to initiated a graph that defines the processing flow of an application to be executed by the system 500. The initiated graph can then be stored in the memory 540.1, accessible by accelerator 510.1, and copies of that graph can be sent via the network 570 to be stored in memories 560.2-560.M, accessible by accelerators 510.2-510.M.

In an aspect, the operation of system 500 is similar to the operation of system 400. However, system 500 also has to maintain the consistent representation of the graph by its copies 550.1-550.M. For example, at the end of each iteration, the copies of the graph 550.1-550.M can be updated by their respective managers 520.1-520.M (e.g., each manager can update the part of the graph it owns), then, the copies can be reconciled. In an aspect, one processor, e.g., 560.1, can be in charge of reconciliation of the graphs. To that end, processors 560.2-560.M can be configured to send their copies of the graph to processor 560.1 which will reconcile the copies 550.1-550.M and send back one reconciled graph to be stored in respective memories 540.1-540.M. In system 500 such communications by APUs that are remote to each other (e.g., when a kernel running on one APU sends a message to a mailbox associated with a kernel running on another APU) can contribute to latency. However, such latency is limited by the bandwidth of the network 570 and is distinguish from latency that is contributed by CPU-APU communication.

FIG. 6 is a flow chart of an example method 600 for accelerator-resident runtime management, based on which one or more features of the disclosure can be implemented. The method 600 can be carried out by an accelerator-resident manager, e.g., the manager 220 of FIG. 2, or one of the managers 420.1-420.M of FIG. 4 or the managers 520.1-520.M of FIG. 5. The method 600, in step 610, can receive a representation of an application's processing flow, including kernels and their respective dependencies. As described above, a representation can be expressed by a graph, e.g., the graph 300 of FIG. 3. In step 620, the method 600 can assign the kernels to APUs managed by the manager. Then, in step 630, the method 600 can launch the kernels on their assigned APUs to run in an iteration according to the kernels' respective dependencies. During the iteration, if there is a change in dependencies (either a termination of a dependency or a creation of a new dependency), the method 600 can inform the affected kernel in step 640. For example, when a dependency of a first kernel on a second kernel is terminated during an iteration, a message can be sent by the second kernel to the first kernel, indicative of the terminated dependency. Upon receipt of that message, the first kernel can begin execution immediately (unless it is still waiting for other kernels to be completed). In another example, when a new dependency of a first kernel on a second kernel is created during an iteration, a mailbox can be created by the second kernel to be waited on by the first kernel; when the second kernel will complete its own execution, it will send a completion-message to that mailbox. At the end of the iteration, in step 650, the method 600 can update the representation. For example, if a change in dependencies occurred during an iteration (either a termination of a dependency or a creation of a new dependency) the method 600 can change the assignment of kernels to APUs based on the change. Thus, in a graph representation 300, the method 600 can repartition the graph, changing the structure of subgraphs 330, 340—in effect changing some of the assignments of kernel A-H 310 to either APU-1 230 or APU-2 240.

It should be understood that many variations are possible based on the disclosure herein. Although features and elements are described above in particular combinations, each feature or element can be used alone without the other features and elements or in various combinations with or without other features and elements.

The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general-purpose computer or a processor. Examples of non-transitory computer-readable storage mediums include read only memory (ROM), random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for runtime management, the method comprising:
   receiving, by a first accelerator, a representation of a processing flow of an application, including a plurality of kernels and respective dependencies;
   assigning, by the first accelerator, a first portion of the plurality of kernels to one or more Accelerated Processing Units (APUs) of a first group of APUs associated with the first accelerator;
   assigning, by the first accelerator, a second portion of the plurality of kernels to a second group of APUs associated with a second accelerator; and
   launching, by the first accelerator, the first portion of the plurality of kernels on the one or more APUs of the first group of APUs according to the respective dependencies,
   wherein the first accelerator and the second accelerator collectively execute the plurality of kernels without CPU-based control.

2. The method of claim 1, wherein the launching is for an iteration, and the method further comprises:
   when a dependency of a first kernel on a second kernel is terminated during the iteration, sending a message, by the second kernel to the first kernel, the message indicative of the dependency.

3. The method of claim 2, further comprising:
   at an end of the iteration, reassigning, by the first accelerator, the kernels to the APUs based on the dependency.

4. The method of claim 1, wherein the launching is for an iteration, and the method further comprises:
   when a dependency of a first kernel on a second kernel is created during the iteration, creating a mailbox by the second kernel to be used by the first kernel to receive a completion message from the second kernel.

5. The method of claim 4, further comprising:
   at an end of the iteration, reassigning, by the first accelerator, the kernels to the APUs based on the dependency.

6. The method of claim 1, further comprising:
   load-balancing, by the first accelerator manager, execution of the first portion of the plurality of the kernels by reassigning a subset of the kernels to another APU based on execution times of the kernels.

7. The method of claim 1, further comprising:
   launching, by the second accelerator, the second portion of the plurality of kernels on one or more of the second group of APUs according to the respective dependencies.

8. The method of claim 7, wherein:
   the first accelerator and the second accelerator are remote to each other, and
   the launching by the second accelerator is performed according to dependencies included in respective copies of the representation and comprises reconciling the respective copies.

9. The method of claim 1, wherein the representation is a graph and wherein:
   each node of the graph is associated with a kernel, of the plurality of kernels, and an APU, of the APUs, and
   each edge of the graph represents a dependency, of the respective dependencies.

10. The method of claim 9, wherein each node of the graph is associated with a timer measuring an execution time of a kernel associated with the node.

11. A system for runtime management, the system comprising:

a first group of Accelerated Processing Units (APUs) associated with a first accelerator;

wherein the first accelerator is configured to:

receive a representation of a processing flow of an application, including a plurality of kernels and respective dependencies;

assign a first portion of the plurality of kernels to one or more APUs of the first group of APUs, assign a second portion of the plurality of kernels to a second group of APU in a second accelerator; and launch, the first portion the plurality of kernels on the one or more APUs of the first group of APUs according to the respective dependencies, wherein the first accelerator and the second accelerator collectively execute the plurality of kernels without CPU-based control.

12. The system of claim 11, wherein the first portion of the plurality of kernels is launched for an iteration, and the first accelerator is further configured to:

when a dependency of a first kernel on a second kernel is terminated during the iteration, send a message, by the second kernel to the first kernel, the message indicative of the dependency; and at an end of the iteration, reassign the kernels to the APUs based on the dependency.

13. The system of claim 11, the first portion of the plurality of kernels is launched for an iteration, and the first accelerator is further configured to:

when a dependency of a first kernel on a second kernel is created during the iteration, create a mailbox by the second kernel to be used by the first kernel to receive a completion message from the second kernel; and at an end of the iteration, reassign the kernels to the APUs based on the dependency.

14. The system of claim 11, wherein the first portion of the plurality of kernels is launched for an iteration, and the first accelerator is further configured to:

load-balance execution of the first portion of the kernels by reassigning a subset of the kernels to another APU based on execution times of the kernels.

15. The system of claim 11, wherein the second portion of the plurality of kernels are launched by the second accelerator on one or more of the second group of APUs according to the respective dependencies.

16. The system of claim 15, wherein:

the first accelerator and the second accelerator are remote to each other.

17. A non-transitory computer-readable medium storing instructions for runtime management, the instructions when executed by a first accelerator, cause the first accelerator to perform a method comprising:

receiving, by the first accelerator, a representation of a processing flow of an application, including a plurality of kernels and respective dependencies;

assigning, by the first accelerator, a first portion of the plurality of kernels to one or more Accelerated Processing Units (APUs) of a first group of APUs associated with the first accelerator that are managed by the first accelerator;

assigning, by the first accelerator, a second portion of the plurality of kernels to a second group of APUs associated with a second accelerator; and launching, by the first accelerator, the first portion of the plurality of kernels on the one or more APUs of the first group of APUs according to the respective dependencies, wherein the first accelerator and the second accelerator collectively execute the plurality of kernels without CPU-based control.

18. The non-transitory computer-readable medium of claim 17, wherein the launching is for an iteration the method further comprises:

when a dependency of a first kernel on a second kernel is terminated during the iteration, sending a message, by the second kernel to the first kernel, the message indicative of the dependency; and at an end of the iteration, reassigning the kernels to the APUs based on the dependency.

19. The non-transitory computer-readable medium of claim 17, wherein the launching is for an iteration the method further comprises:

when a dependency of a first kernel on a second kernel is created during the iteration, creating a mailbox by the second kernel to be used by the first kernel to receive a completion message from the second kernel; and at an end of the iteration, reassigning the kernels to the APUs based on the dependency.

20. The non-transitory computer-readable medium of claim 17, the method further comprising:

load-balancing, by the first manager, execution of the first portion of the plurality of the kernels by reassigning a subset of the kernels to another APU based on execution times of the kernels.

* * * * *